United States Patent Office 2,945,877
Patented July 19, 1960

2,945,877
CARBAMIC ACID ESTERS OF 2,4,5-TRICHLOROPHENOL

Otto Zima, Darmstadt-Eberstadt, and Ernst Jacobi, Darmstadt, Germany, assignors to E. Merck, Aktiengesellschaft, Darmstadt, Germany, a corporation of Germany No Drawing. Filed Nov. 26, 1957, Ser. No. 698,924

Claims priority, application Germany Dec. 4, 1956

10 Claims. (Cl. 260—471)

This invention relates to esters of 2,4,5-trichlorophenol; and, in particular, is directed to the N-monosubstituted carbamic acid esters thereof.

The well known excellent fungistatic activity of 2,4,5-trichlorophenol, because of its strong irritating action, has not been utilized medicinally, for example, in combatting the mycosa of the skin or mucous membranes. The esters of 2,4,5-trichlorophenol, particularly the N-disubstituted carbamic acid esters, are much better tolerated, but the fungistatic activity thereof required for therapeutic use is not adequate.

The present invention deals with the problem of preparing derivatives of 2,4,5-trichlorophenol, which possess good fungistatic activity combined with good tolerability. These requirements are provided by the hitherto unknown N - monosubstituted carbamic acid-2,4,5-trichlorophenyl esters of the formula:

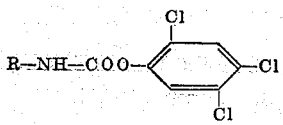

wherein R is phenyl or substituted phenyl. These N-monosubstituted carbamic acid-2,4,5-trichlorophenyl esters can be prepared in the following ways: by reacting a primary amine with the 2,4,5-trichlorophenyl ester of chloroformic acid or carbonic acid or of cyano-formic acid; also by the addition of 2,4,5-trichlorophenol to an isocyanate or by the reaction of said phenol with N-monosubstituted urea or carbamic acid chloride or bromide.

The reaction course is indicated by the following equations, wherein R is alkyl, phenyl or substituted phenyl, and R' designates the 2,4,5-trichlorophenyl radical:

(1) $R-NH_2+Cl-COOR' \rightarrow R-NH-COOR'+HCl$
(2) $R-N=C=O+R'-OH \rightarrow R-NH-COOR'$
(3) $R-NH-CO-Cl+R'OH \rightarrow R-NH-COOR'+HCl$
(4) $R-NH_2+N=C-COOR' \rightarrow R-NH-COOR'+HCN$
(5) $R-NH_2+CO=(OR')_2 \rightarrow R-NH-COOR'+R'OH$
(6) $R-NH-CO-NH_2+R'OH$
 $\rightarrow R-NH-COOR'+NH_3$ The above reactions 1 and 2 run particularly well, and thus are advantageous for the preparation of the N-monosubstituted carbamic acid-2,4,5-trichloro-phenyl esters.

The following are examples in accordance with the invention. The weights are in grams (g.). All temperatures are in degrees centigrade.

EXAMPLE 1

*N-methylcarbamic acid-2,4,5-trichlorophenyl ester*

40 g. of chloroformic acid-2,4,5-trichlorophenyl ester and a solution of 10.4 g. of methylaminehydrochloride in 15 ccm. of water were mixed. After stirring and cooling 29 ccm. of a 32% caustic solution were slowly added thereto dropwise. After completion of the reaction the precipitate obtained was removed by suction, and washed with water. The N-methylcarbamic acid-2,4,5-trichlorophenyl ester was recrystallized from ethyl acetate. Its M.P. was 157°–159° C.; the yield 17.0 g.

EXAMPLE 2

*N-phenylcarbamic acid-2,4,5-trichlorophenyl ester*

19.8 g. of 2,4,5-trichlorophenol were reacted with 11.9 g. of phenylisocyanate. After the addition of a drop of triethylamine the reaction is initiated by spontaneous warming. Upon completion of the reaction, the mass was cooled, and the product recrystallized from benzene/petroleum ether. There were obtained 28.0 g. of N-phenylcarbamic acid-2,4,5-trichlorophenyl ester, having a melting point of 126–128° C.

EXAMPLE 3

*N-m-tolylcarbamic acid-2,4,5-trichlorophenyl ester*

To a solution of 21.4 g. of m-toluidine in 200 ccm. of absolute ether there were added dropwise, under stirring, 26.0 g. of chloroformic acid-2,4,5-trichlorophenyl ester in 100 ccm. of absolute ether, whereby the reaction mixture spontaneously underwent slight warming. Subsequently, after ½ hour the mixture was heated under reflux, cooled, and poured into ice water. The ethereal layer was separated, and the aqueous layer washed with ether. The combined ethereal solutions were dried over calcium chloride, filtered through charcoal, and the ether distilled off. The residue was triturated with hexane; and recrystallized from ethyl acetate or cyclohexane. Its M.P. was 132° C.; the yield, 26.5 g.

EXAMPLE 4

*N-methylcarbamic acid-2,4,5-trichlorophenyl ester*

29 g. of N-methylcarbamic acid chloride and 93 g. of 2,4,5-trichlorophenol were heated to boiling for several hours in 225 ccm. of absolute benzene. Upon distilling off the benzene, the residue was extracted with petroleum ether. The petroleum ether takes up the excess 2,4,5-trichlorophenol. The portion which is insoluble in the petroleum ether, can be recrystallized from ethyl acetate, and has a melting point of 157–159° C.

EXAMPLE 5

*N-phenylcarbamic acid-2,4,5-trichlorophenyl ester*

21.0 g. of the carbonic acid ester of 2,4,5-trichlorphenol were dissolved in aniline and heated for a short time to about 80° C. After separating the excess aniline, the reaction product was recrystallized from ethyl acetate. The resulting N-phenylcarbamic acid-2,4,5-trichlorphenyl ester was identified by its melting point, mixed melting point and analytical methods.

N-ethyl-carbamic acid-2,4,5-trichlorophenyl ester, M.P. 116–117°.

N-p-chlorophenylcarbamic acid - 2,4,5 - trichlorophenyl ester, M.P. 135°.

N-m-chlorophenyl-carbamic acid - 2,4,5 - trichlorophenyl ester, M.P. 144–145°.

N-o-tolylcarbamic acid-2,4,5-trichlorophenyl ester, M.P. 128–130°.

N-p-tolylcarbamic acid-2,4,5-trichlorophenyl ester, M.P. 144°.

N-p-nitrophenylcarbamic acid-2,4,5-trichlorophenyl ester, M.P. 182°.

All these compounds were subjected to tolerance tests, as well as to determinations of their fungicidal and fungistatic activity. The tolerance tests and acute oral toxicity were carried out with mice, using N-disubstituted carbamic acid esters of 2,4,5-trichlorophenol for comparison. On oral application, the N-monosubstituted carbamic acid esters showed half the toxicity of the disubstituted esters;

and from 10 to 20 times the tolerability of the 2,4,5-trichlorophenol. Skin irritation of the rabbit ear, and also irritation of mucous membranes as observed on the rabbit conjunctiva, showed that the N-monosubstituted carbamic acid compounds were essentially better tolerated than the N-disubstituted derivatives and 2,4,5-trichlorophenol.

The germ inhibition activity of the N-monosubstituted products against coli and paratyphus-bacteria, hemolytic staphlococci and streptococci was 10 times that of the N-disubstituted substances; and against the skin pathogenic fungi, Tricophyton mentagrophytes and Candida albicans the inhibition was from 2 to 10 times as great as that of the N-disubstituted substances. The fungicidal activity of the N-monosubstituted derivatives against the soil fungus, Rhizoctonia solani (by the filter plate method) is about 50 times as great as that of the N-disubstitued carbamic acid-2,4,5-trichlorophenyl esters, and about as great as that of tetramethylthiuramdisulfide.

The growths of the fungi, Fusicladium dendriticum and Alternaria spec. are much more stunted by the compounds of this invention than by the N-disubstituted esters.

Investigations of the fungistatic activity of these new compounds were also extended to include the pathogenic fungi, Epidermophyton floccosum, Sporotrichon schenkii, Tricophyton rubrum, and Microsporon andonini. In these cases, too, the N-monosubstituted compounds were, on the average, 2 to 10 times as active as the N-dialkyl-substituted carbamic acid-2,4,5-trichlorophenyl esters.

The aforesaid compounds of this invention are well tolerated and exhibit very good fungicidal and fungistatic activity particularly against skin pathogens and soil fungi.

It has been found especially that the above described new compounds are particularly advantageous as added antimycotic agents in soaps. Furthermore, they have noteworthy usefulness in combating slime forming fungi and bacteria in the cellulose industry and for inhibiting the moulding or mildewing of cellulose fibres, such as wood, pulp, paper and other vegetable products.

It will be understood that the foregoing description of the invention and the examples set forth are merely illustrative of the principles thereof. Accordingly, the appended claims are to be construed as defining the invention within the full spirit and scope thereof.

We claim:
1. Compounds having the general formula

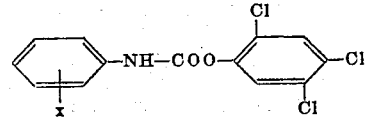

wherein X designates a member of the group consisting of hydrogen, methyl, $NO_2$ and chlorine.

2. The N-phenyl-carbamic acid-2,4,5-trichlorophenyl ester.

3. The N-o-tolyl carbamic acid-2,4,5-trichlorophenyl ester.

4. The N-p-nitrophenyl carbamic acid-2,4,5-trichlorophenyl ester.

5. The N-p-chlorophenyl carbamic acid-2,4,5-trichlorophenyl ester.

6. The N-m-chlorophenyl carbamic acid-2,4,5-trichlorophenyl ester.

7. The N-m-tolyl carbamic acid-2,4,5-trichlorophenyl ester.

8. The 2,4,5-trichlorophenyl esters of N-tolyl carbamic acid.

9. The 2,4,5-trichlorophenyl esters of N-chlorophenyl-carbamic acid.

10. The 2,4,5-trichlorophenyl esters of N-nitrophenyl carbamic acid.

References Cited in the file of this patent
UNITED STATES PATENTS 2,858,328   Beaver et al _____ Oct. 28, 1958

OTHER REFERENCES

Thompson: Bot. Gazette, 107, 490–1 (1946).